(12) United States Patent
Johns et al.

(10) Patent No.: US 7,861,875 B2
(45) Date of Patent: Jan. 4, 2011

(54) SEAL FOR TUBE

(75) Inventors: Clifford L. Johns, Louisville, KY (US); Daniel D. Sympson, Louisville, KY (US); August M. Dattilo, III, Louisville, KY (US); Munaf Najmuddin Chasmawala, Louisville, KY (US); Manfred Schmidt, Louisville, KY (US)

(73) Assignee: TubeMaster, Inc., Louisville, KY (US)

( * ) Notice: Subject to any disclaimer, the term of this patent is extended or adjusted under 35 U.S.C. 154(b) by 415 days.

(21) Appl. No.: 12/022,311

(22) Filed: Jan. 30, 2008

(65) Prior Publication Data
US 2008/0184779 A1 Aug. 7, 2008

Related U.S. Application Data

(60) Provisional application No. 60/887,855, filed on Feb. 2, 2007.

(51) Int. Cl.
*B65D 39/00* (2006.01)
*G01M 3/00* (2006.01)
(52) U.S. Cl. ...................... 215/355; 73/49.8

(58) Field of Classification Search ................ 215/355; 73/40, 49.8
See application file for complete search history.

(56) References Cited

U.S. PATENT DOCUMENTS

| 3,845,787 | A | * | 11/1974 | Slagle | 137/571 |
| 3,916,960 | A | * | 11/1975 | Thompson | 141/1 |
| 4,953,728 | A | * | 9/1990 | Meek | 215/250 |
| 5,636,757 | A | * | 6/1997 | Porvaznik | 215/364 |
| 5,924,585 | A | * | 7/1999 | Henderson et al. | 215/274 |
| 6,694,802 | B1 | | 2/2004 | Comardo | |
| 6,715,624 | B2 | * | 4/2004 | Brockwell | 215/247 |
| 6,725,706 | B2 | | 4/2004 | Johns | |

FOREIGN PATENT DOCUMENTS

DE 1900716 8/1970
DE 29803091 6/1998

* cited by examiner

*Primary Examiner*—John Fitzgerald
(74) *Attorney, Agent, or Firm*—Theresa Fritz Camoriano; Guillerno Camoriano; Camoriano & Associates

(57) ABSTRACT

A seal for sealing against the interior of a tube includes upper and lower rigid plates with flexible plates between them, which are compressed to form a seal.

8 Claims, 16 Drawing Sheets

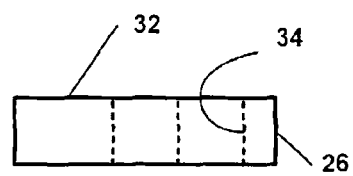
Fig. 8
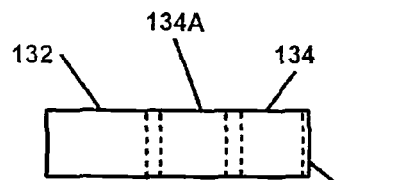
Fig. 8A
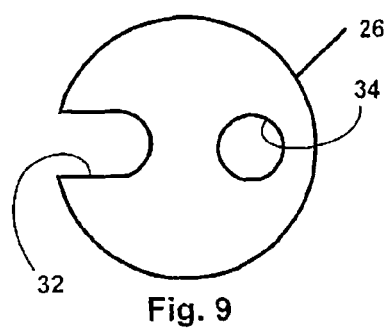
Fig. 9
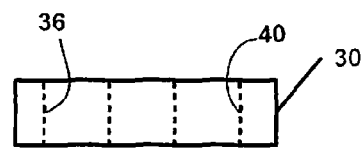
Fig. 10
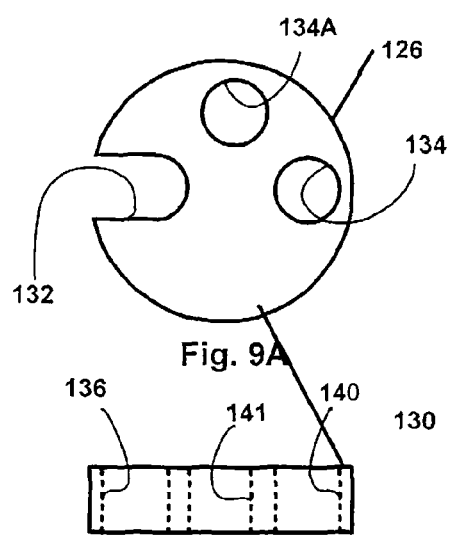
Fig. 9A
Fig. 10A
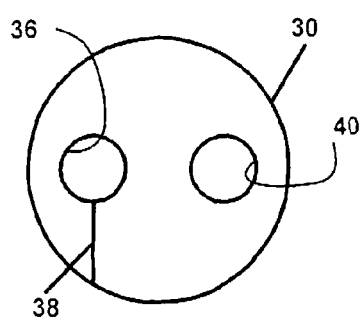
Fig. 11
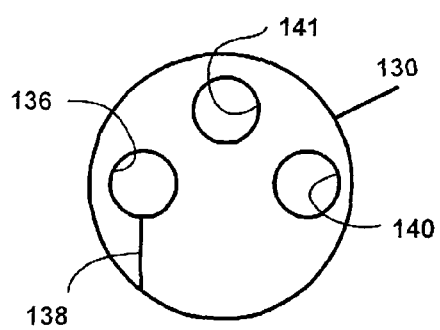
Fig. 11A

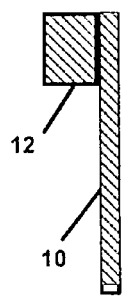
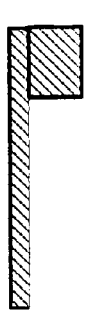
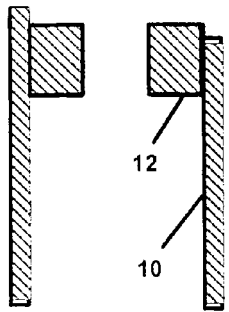
Fig. 13　　　　　　Fig. 14　　　　　　Fig. 15
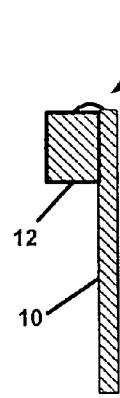
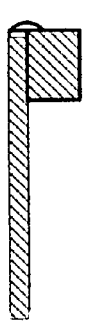
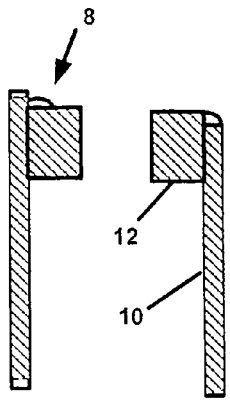
Fig. 16　　　　　　Fig. 17　　　　　　Fig. 18

US 7,861,875 B2

SEAL FOR TUBE

BACKGROUND

This application claims priority from U.S. Provisional Application Ser. No. 60/887,855 filed Feb. 2, 2007.

The present invention relates to a sealing arrangement and to a mechanism for testing to ensure that a good seal has been made. U.S. Pat. Nos. 6,725,706 and 6,981,404, which are hereby incorporated herein by reference, describe a system for blowing down and testing chemical reactor tubes. That system uses inflatable seals to seal against the inner wall of the reactor tube before injecting air into the tube and measuring the back pressure to determine whether the tube has been loaded properly with catalyst. In the course of using that system, two issues have arisen that are resolved here. The first is how to seal against a thermowell projection, which has an insert extending down into the tube for supporting thermocouples to measure temperature (or how to seal against other tubes, including ducts or ports, with similar types of obstructions). The second is how to know for certain that a good seal has been made so any measurement that is taken will be accurate.

BRIEF DESCRIPTION OF THE DRAWINGS

FIG. 8 is a front view of one of the rigid plates of the sealing device of FIG. 5;

FIG. 8A is a front view of an alternative rigid plate with an additional hole;

FIG. 9 is a top view of the rigid plate of FIG. 8;

FIG. 9A is a top view of the rigid plate of FIG. 8A;

FIG. 10 is a front view of one of the flexible plates of the sealing device of FIG. 5;

FIG. 10A is a front view of an alternative flexible plate with an additional hole;

FIG. 11 is a top view of the flexible plate of FIG. 10;

FIG. 11A is a top view of the flexible plate of FIG. 10A;

FIGS. 13-18 are section views through chemical reactor tubes showing various types of conditions that may be encountered in the top portion of the tube to be sealed;

DESCRIPTION

Figure 1:
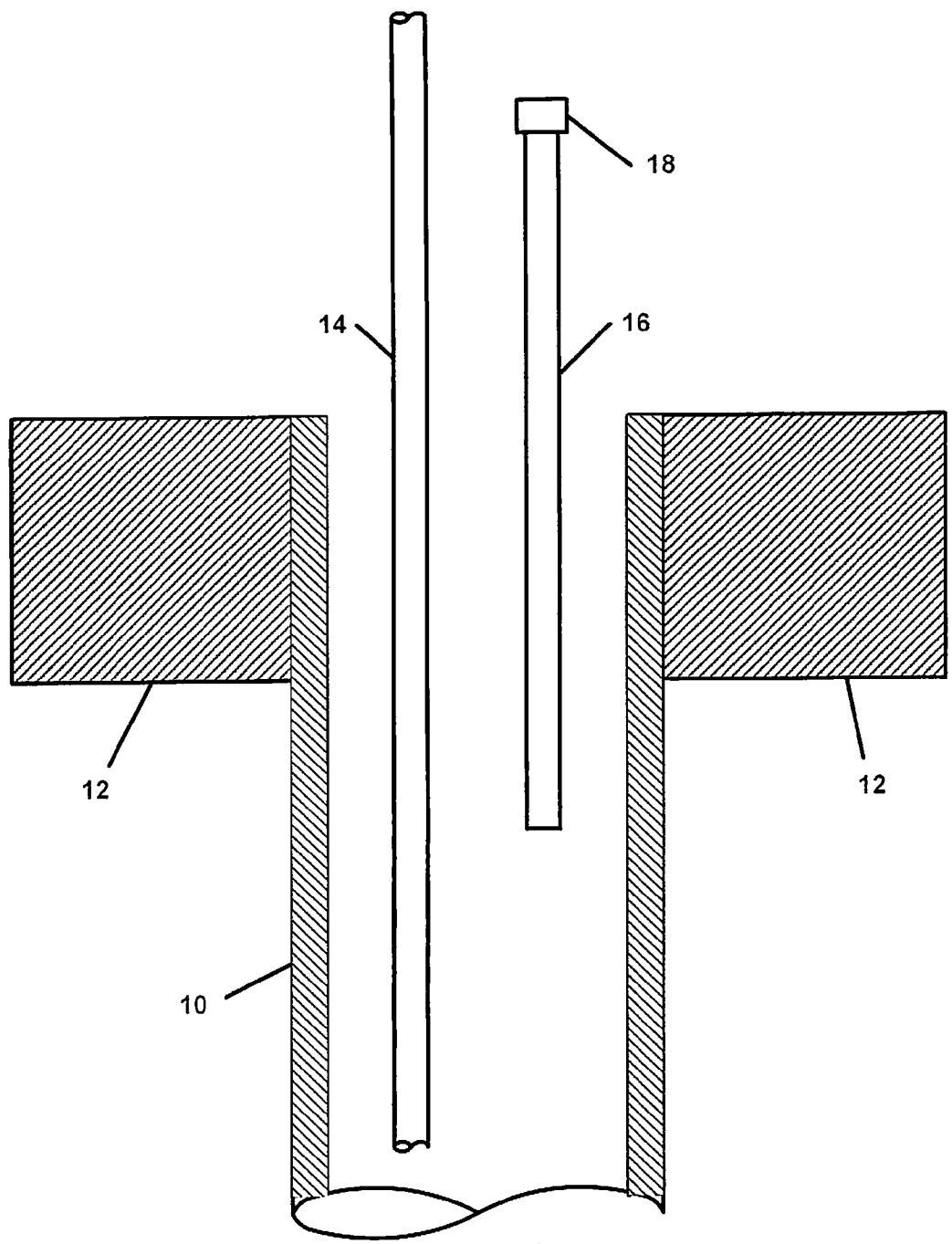
FIG. 1 is a section view through a vertical tube chemical reactor showing one of the thermowell vertical tubes.

FIG. 1 shows a reactor tube 10 extending downwardly from a tube sheet 12 of a chemical reactor. This particular reactor tube 10 has a thermowell projection 14 extending downwardly into the tube 10 and projecting out the top of the tube 10. Also shown in this view is an injector tube 16, which is to be inserted temporarily into the reactor tube 10 to inject pressurized gas into the tube 10 for determining whether the tube 10 has been properly loaded with catalyst, or for blowing down the tube, as described in the '706 and '404 patents listed above. There may be as many as fifty or more thermowells to be tested on a reactor. The type of seal that is used in the '706 and '404 patents does not accommodate the thermowell projection 14. Thus, a different type of seal is used for those special reactor tubes that have thermowells or other similar projections or obstructions 14, which may be a probe to measure temperature, a probe to measure pressure, a sampling probe to sample gas, an injection probe to inject additives, or other types of projections.

The seal should be temporary as well as easy and quick to install and remove. The test typically is done at ambient temperature, but the tube sheet 12 may be hotter than typical ambient temperature, sometimes as high as 130 degrees F. The seal should be able to withstand the back pressure that is generated during the testing procedure without leaking. In tests that have been conducted so far, the back pressure has been as high as 30 psig, but it typically is 4-7 psig. Higher pressures can be accommodated by adding additional flexible plates 30 and rigid plates 28/26 (See FIG. 5) as described in more detail below.

Figure 2:
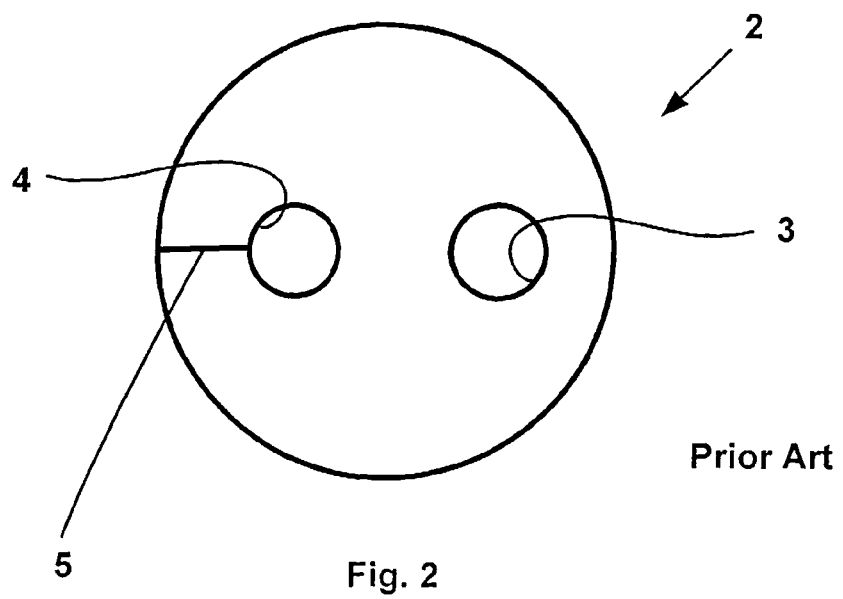
FIG. 2 is a top view of a rubber stopper.
Figure 3:
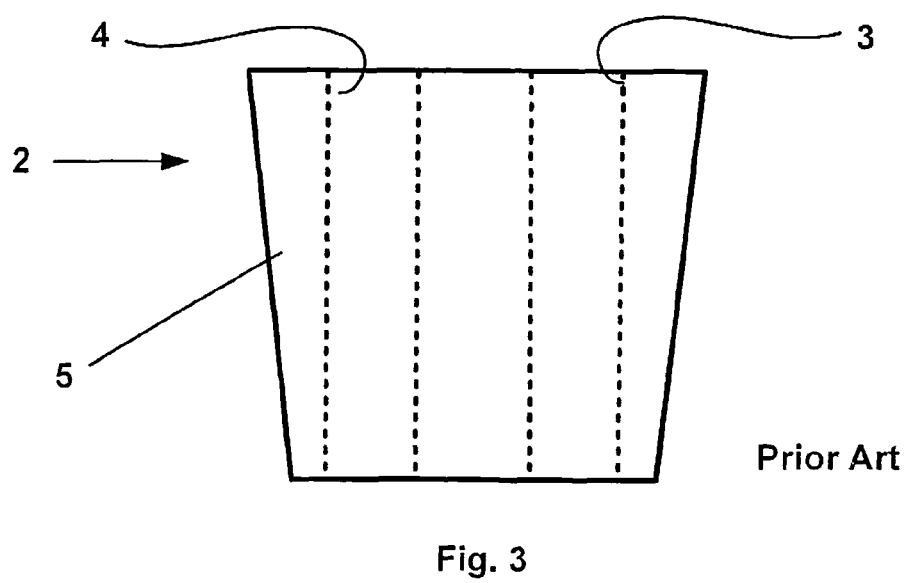
FIG. 3 is a front view of the rubber stopper of FIG. 2.
Figure 4:
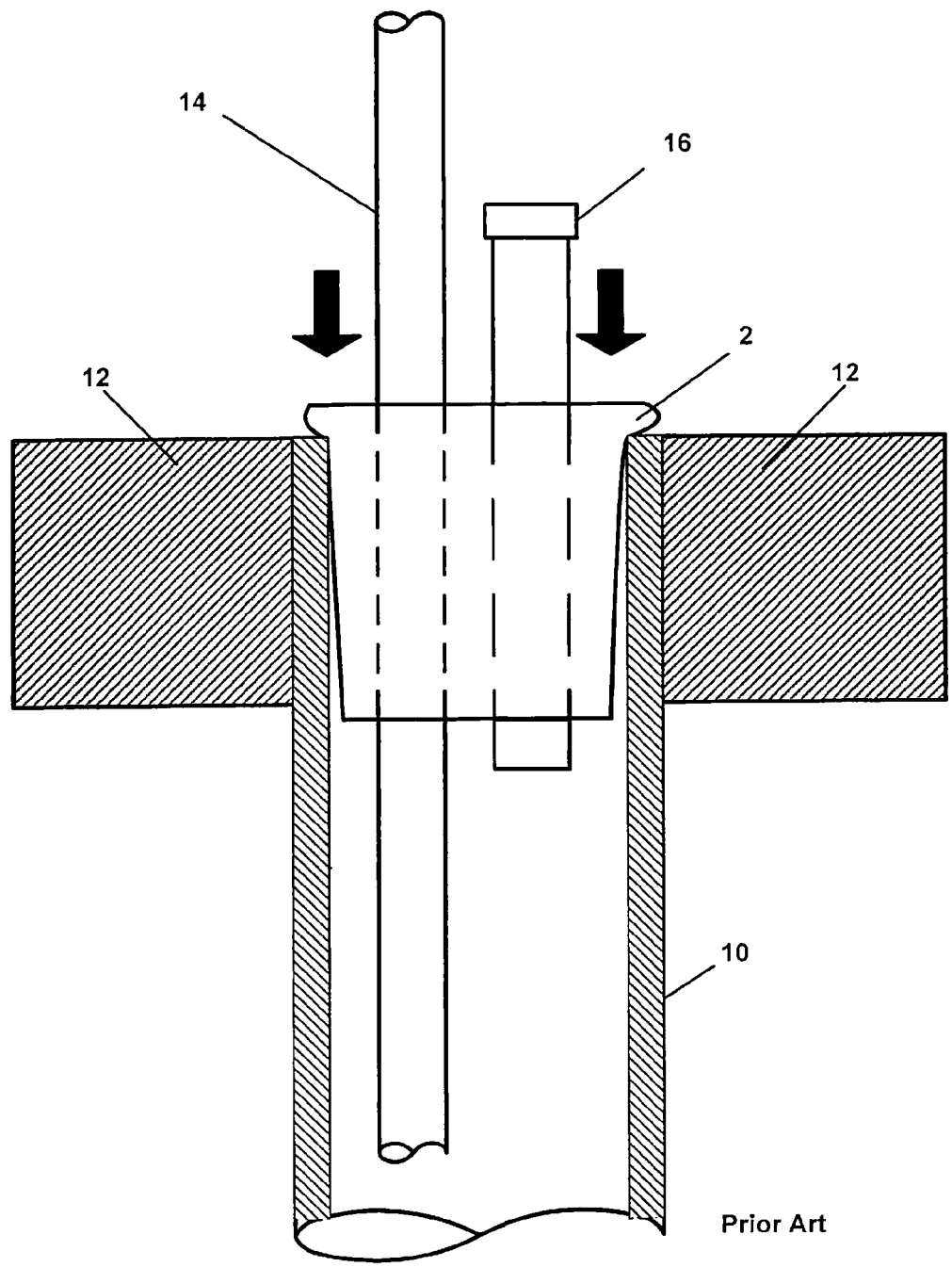
FIG. 4 is a section view showing the stopper being used to seal inside the reactor tube.

Various sealing mechanisms have been tried in the past. For example, FIGS. 2-4 show a rubber stopper 2 being used. The rubber stopper 2 defines a first opening 3 to accommodate the injector tube 16, and a second opening 4 to accommodate the thermowell projection 14. A slit 5 (See FIGS. 2 and 3) extends vertically the full length of the stopper 2, extending the second opening 4 to the perimeter of the stopper 2 so that the thermowell projection 14 may be inserted into the second opening 4 of the stopper 2 without having to remove the thermowell projection 14 from its reactor tube 10.

As shown in FIG. 4, the stopper 2 seals only at the top edge of the reactor tube 10. This type of seal tends to leak, as the back pressure tends to push the stopper upwardly, out of the tube 10. Other sealing methods, such as duct tape, viscoelastic materials and putty have been used as well. They tend to leave residue, are hard to use, portions may fall into the tube, and they do not seal reliably.

FIGS. 5-11 show a sealing device 50 that solves many of the problems of prior art seals. This sealing device 50 accommodates both the projection 14 and the tube 16 for injecting gas to conduct the test.

In this embodiment, the sealing device 50 includes upper and lower rigid plates 26, 28, and a plurality of flexible plates 30 sandwiched between the upper and lower rigid plates 26, 28. The details of the top rigid plate 26 are shown in FIGS. 8 and 9, and the top rigid plate 26 is identical to the bottom rigid plate 28. The top rigid plate 26 defines a first opening 32, which extends to the perimeter of the plate 26 and receives the projection 14, and a second opening 34, which receives the injector tube 16.

The details of the flexible plates 30 are shown in FIGS. 10 and 11. Each flexible plate 30 defines a first opening 36 that extends to the perimeter of the plate for receiving the projection 14, and a second opening 40, which receives the injector tube.

The first openings 32, 36 of all the plates are vertically aligned to receive the projection 14, and the second openings 34, 40 of all the plates are vertically aligned to receive the injector tube 16, which has a connector 18 at its top end for connecting to the injection gas line. However, the slit portions 38 of the first openings 36 in the flexible plates 30, which extend to the perimeter of the flexible plates 30, are not aligned with the portions of the first openings 32 of the rigid plates 26, 28 that extend to the perimeters of the rigid plates. As shown in FIGS. 9 and 11, the first openings 32 of the rigid plates 26, 28 extend to the left, while the slit portions 38 of the first openings 36 of the flexible plates 30 extend to the front, so the first openings 32, 36 are not coextensive all the way to the perimeter, even though all the first openings 32, 36 extend to the perimeter of their respective plates.

Figure 5:
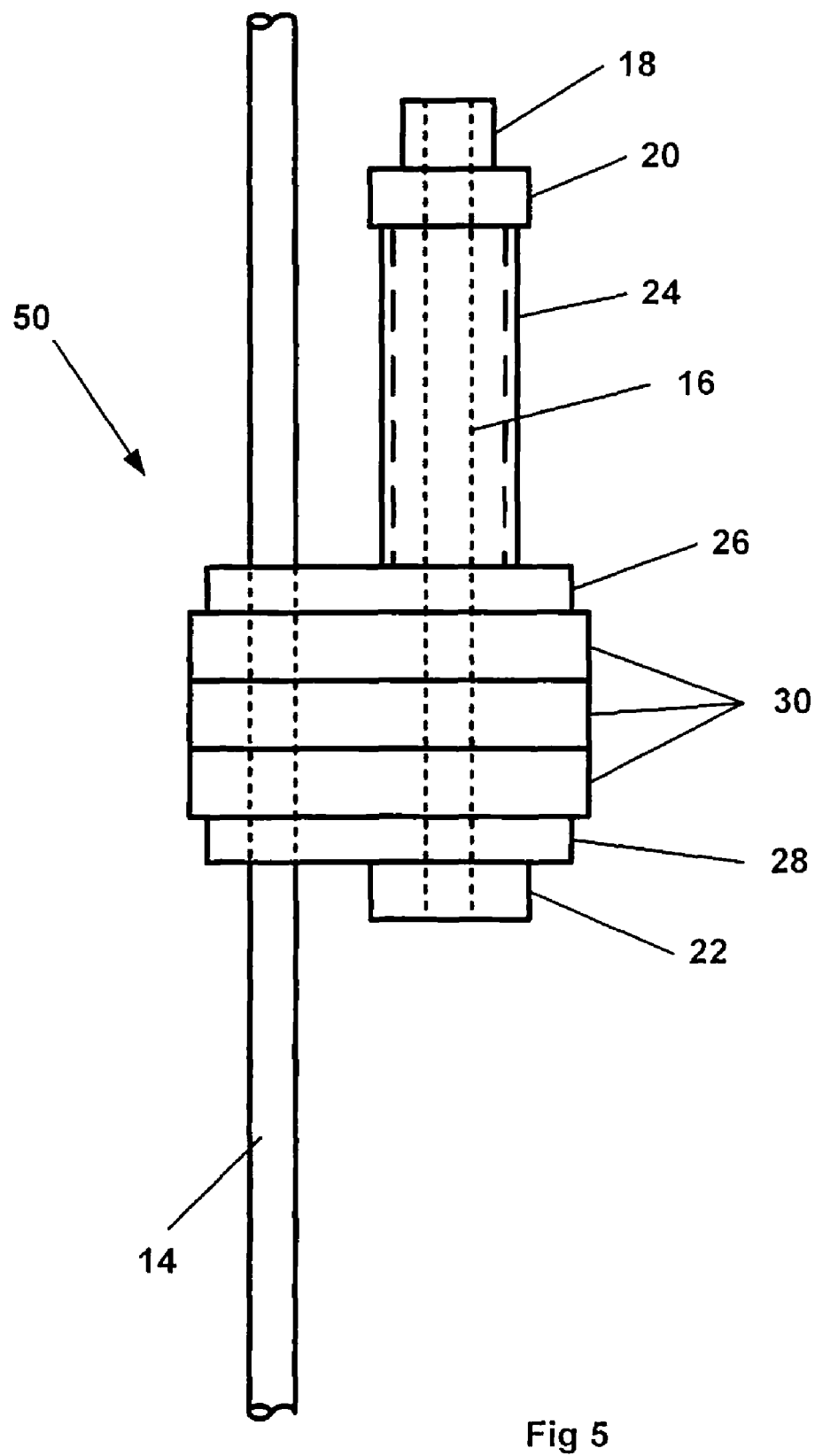
FIG. 5 is a front view of a sealing device made in accordance with the present invention.
Figure 6:
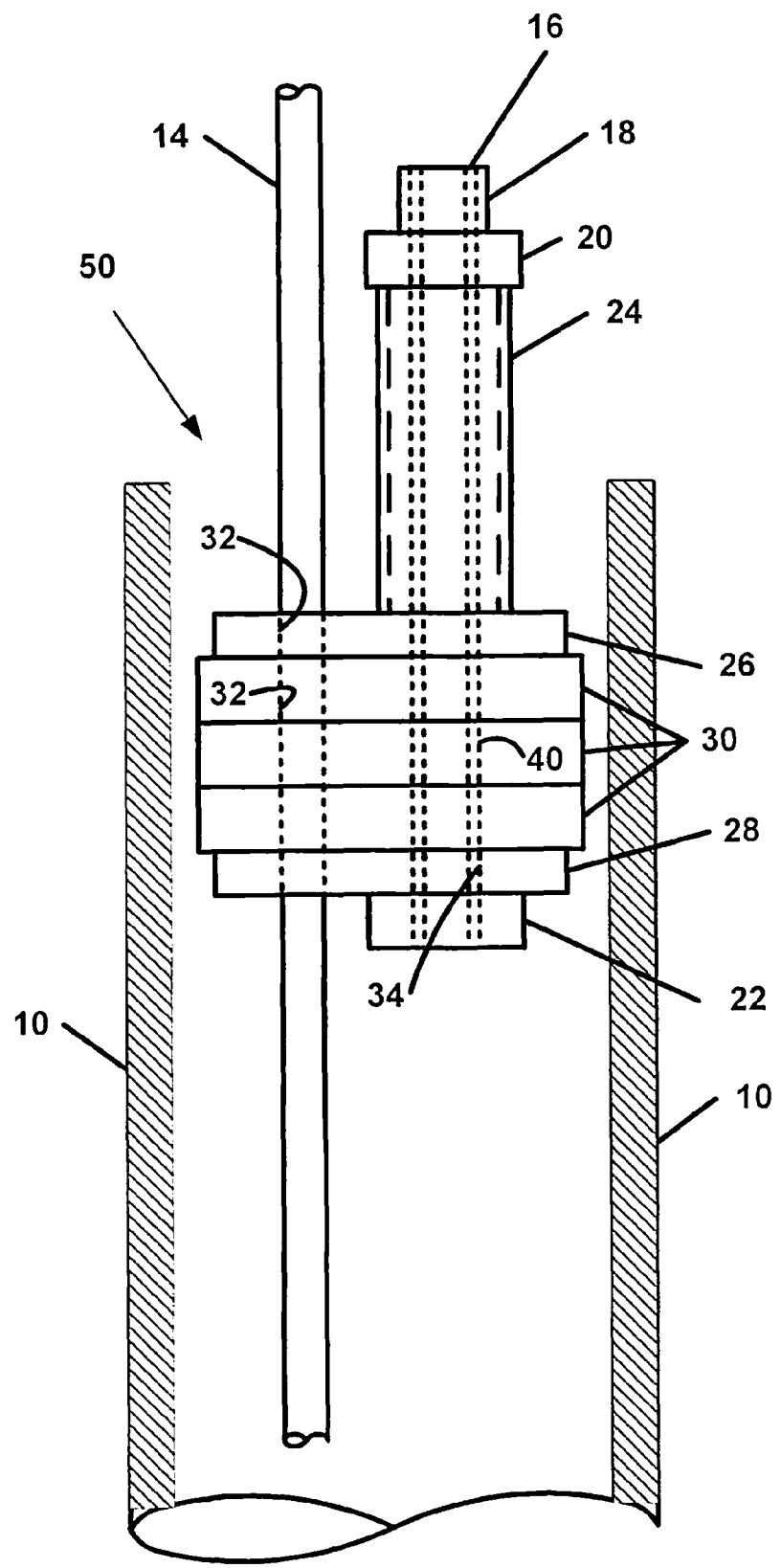
FIG. 6 is a section view showing the sealing device of FIG. 5 after it has been inserted into the reactor tube.
Figure 7:
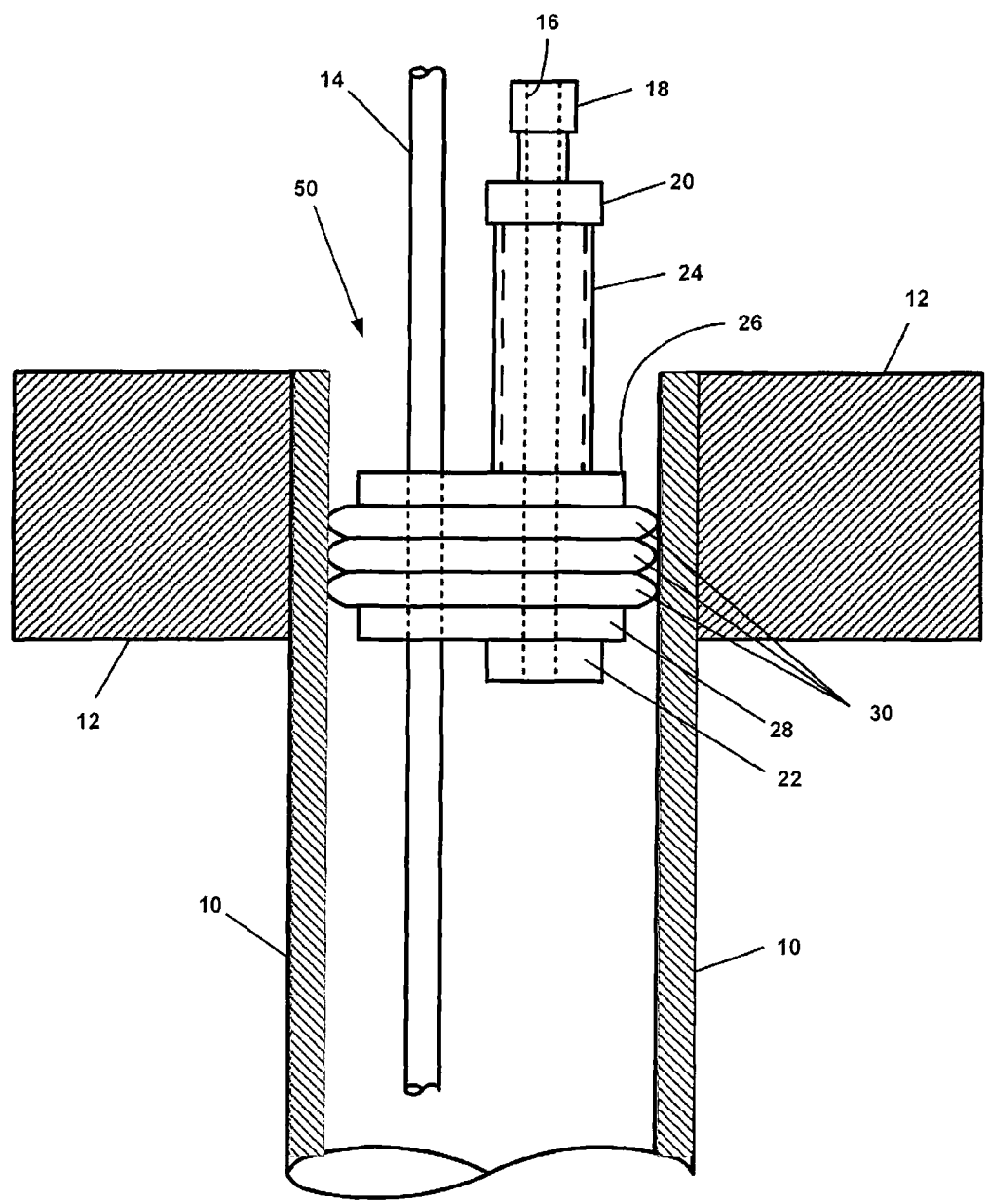
FIG. 7 is the same view as FIG. 6 but after the sealing device has been compressed in order to seal against the tube.

As shown in FIGS. 5-7, a mechanism for moving the upper and lower plates 26, 28 toward each other to compress the flexible plates 30 is mounted around the injector tube 16. This compression mechanism includes upper and lower nuts 20, 22 threaded onto the injector tube, and a compression sleeve 24 between the upper and lower nuts 20, 22. The injector tube 16 extends through the vertically aligned second openings 34, 40 in the upper and lower rigid plates and flexible plates 26, 28, 30, respectively.

As shown in the relaxed position in FIG. 6, the rigid plates 26, 28 and the flexible plates 30 form a type of sandwich, with the rigid plates 26, 28 on the top and bottom, and the flexible plates 30 sandwiched between the rigid plates 26, 28. This particular embodiment uses three flexible plates 30, but the number may vary depending upon the application.

FIG. 7 shows the sealing device 50 after the upper nut 20 has been tightened downwardly against the compression sleeve 24, which, in turn, has pushed downwardly against the upper rigid plate 26. The lower rigid plate 28 cannot move downwardly, because it is stopped by the lower nut 22, so, as the upper rigid plate 26 moves downwardly toward the lower rigid plate 28, the flexible plates 30 are compressed in the vertical (axial) direction, causing them to expand radially outwardly to seal against the inner surface of the reactor tube. They also seal around the projection 14 and the injector tube 16.

In use, the injector tube 16, nuts 20, compression sleeve 24, rigid plates 26 and flexible plates 30 stay assembled together and are moved from one reactor tube to another. In order to insert the sealing device 50 into a reactor tube 10 with a projection 14, the nut 20 is loosened so the upper and lower rigid plates 26, 28 are separated a substantial distance apart. The slits 38 on the first openings 36 of the flexible plates 30 are pushed apart to form a passageway which allows the projection 14 to slide into those first openings 36. Then the device 50 is slid sideways and the flexible plates 30 are flexed opening up the slits 38 (as indicated above) to position each flexible plate 30 onto the projection 14. The slits 38 in adjacent flexible plates 30 preferably extend in opposite directions (i.e. one flexible plate 30 is oriented in the forward direction as shown in FIG. 11 and the next flexible plate 30 is flipped over so its slit 38 is extending in the rearward direction) so the slits 38 of adjacent flexible plates 30 are not aligned with each other.

As the seal 50 is moved sideways, the projection 14 also enters into the first openings 32 of the rigid plates 26, 28. Once the projection 14 is extending through the first holes 36 in the flexible plates 30 and the first holes 32 of the upper and lower rigid plates 26, 28, the slits 38 of the flexible plates 30 are pushed back together again so all the flexible plates 30 are lying flat with the projection 14 received in their respective vertically aligned first openings 36.

Then, the upper and lower rigid plates 26, 28 are moved toward each other to compress the flexible plates 30. First, the upper nut 20 is tightened somewhat to bring the assembly together, and the assembly 50 is slid down the projection 14 into the reactor tube 10. Then the upper nut 20 is tightened more in order to compress the flexible plates 30, causing their outside diameters to expand and form the seal, and then the blowdown or test is conducted.

Figure 24:
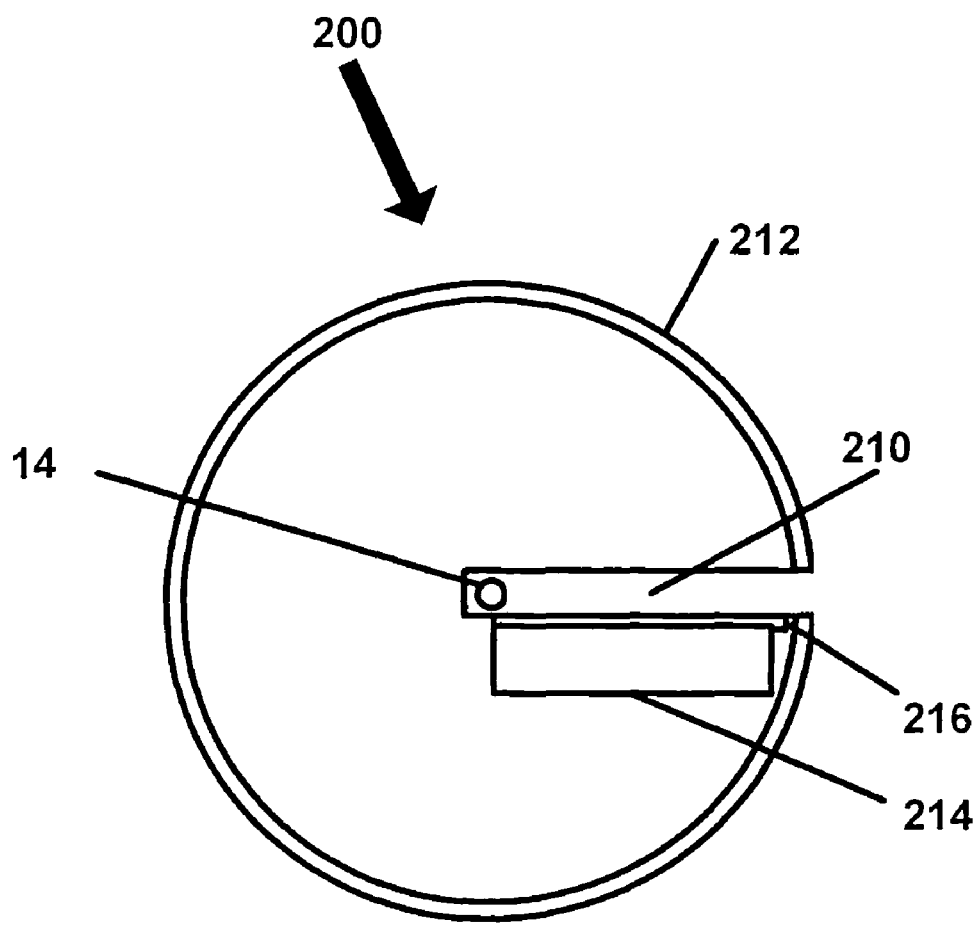
FIG. 24 is a top view of a tray for use with the device of the present invention.
Figure 25:
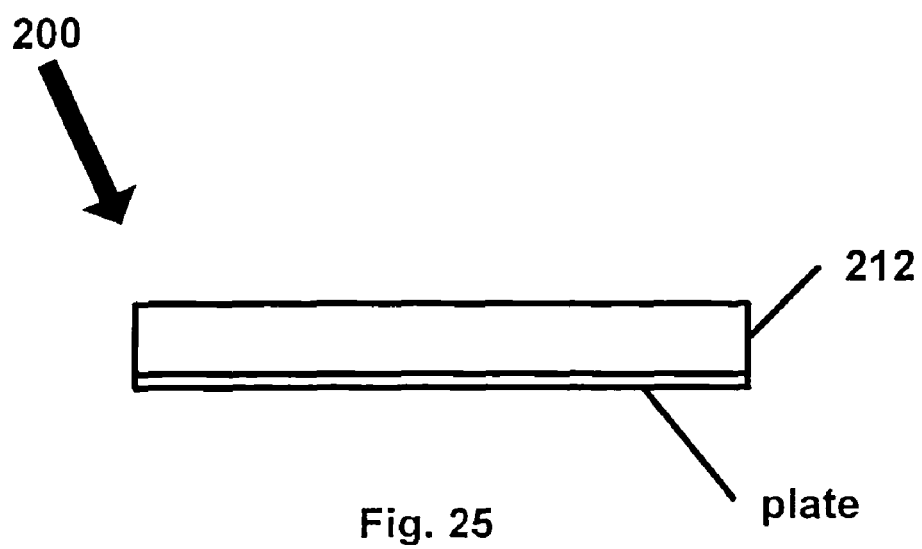
FIG. 25 is a side view of the tray of FIG. 24.

Before the device 50 is used, a tray 200 (See FIGS. 24 and 25) is placed on top of the reactor tube 10, resting on the tube sheet 12, with the projection 14 fitting into a slot 210 in the tray 200. The tray 200 has a flat bottom with a raised rim 212 around its circumference. A plate 214 is hinged to the flat bottom by means of a hinge 216 to allow the plate 214 to be pivoted closed, thereby closing the remainder of the slot 210. Then the device 50 is assembled onto the thermocouple projection 14 with the tray 200 preventing any loose parts of the device 50 from falling into the reactor tube 10. Once the device 50 is assembled onto the thermocouple projection 14, the tray 200 is removed and the device 50 is inserted into the reactor tube and is used as described above.

Once the test has been conducted, or the reactor tube 10 has been blown down, the upper nut 20 is loosened so the flexible plates 30 can return to their relaxed position, and the device 50 is then removed from the reactor tube 10 to be used in another location. The tray 200 may be used again while the device 50 is being disassembled, again to prevent any loose parts from falling into the reactor tube 10. While these drawings only show the connector 18 at the top of the device 50, it is understood that, in use, the connector 18 would be connected to a source of compressed gas, such as an injector from the hand held wand of the device shown in the referenced '706 and '404 patents.

While this device 50 has been shown for use with a thermowell projection, it could be designed to accommodate other types of projections or obstructions, or, if the holes in the flexible plates 30 were eliminated, it could be used in a regular tube without a projection where a temporary seal is desired.

Figure 12:
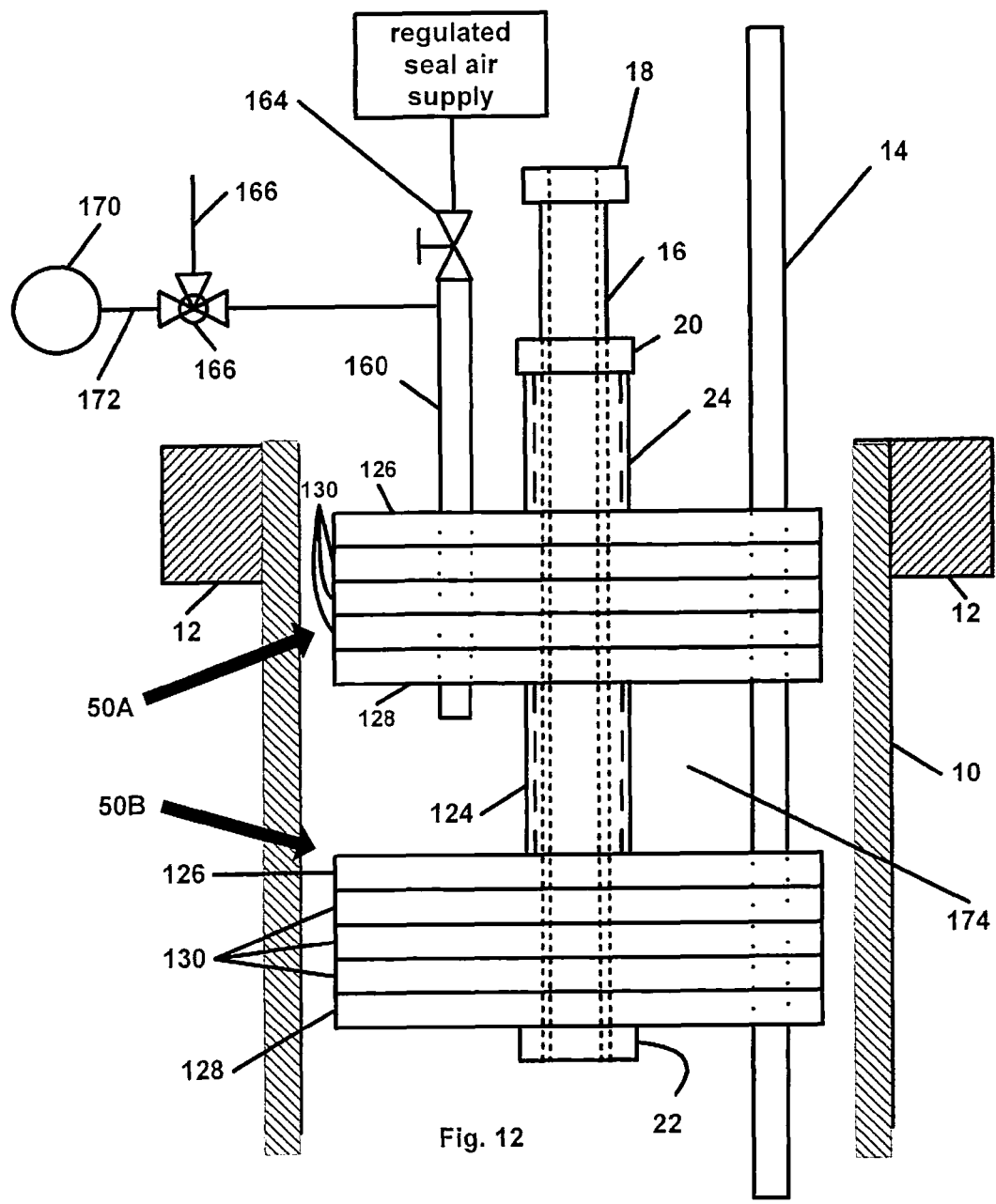
FIG. 12 is a section view through a vertical tube chemical reactor showing an alternative sealing device which includes inner and outer seals and a mechanism for ensuring that a good seal has been made.

FIG. 12 shows another adaptation of the seal device described above. In this case, there are inner and outer seals, including two sets 50A, 50B of sandwiched rigid plates 126, 128 and flexible plates 130, with a compression sleeve 124 between them. Also, in this embodiment, there is a third hole 134A (See FIG. 9A) in each of the rigid plates 126, 128 and vertically aligned matching third holes 141 (See FIG. 11A) in the flexible plates 130 in order to receive an additional tube 160 (See FIG. 12) that serves both as an air supply tube and as a vent tube. The additional tube 160 receives a regulated air flow which passes through an isolation valve 164. A three-way valve 166 is used to allow air to pass out through a vent 166 to atmosphere or to a pressure sensor 170. The pressure sensor 170 is in communication with the tube 160 through a conduit 172, and through the valve 166, in order to measure the pressure in the void space or axial gap 174 between the outer and inner seals 50A, 50B.

Once the seals 50A, 50B have been tightened in place to seal against the inner wall of the reactor tube 10, the supply valve 164 is opened, and pressurized air (or other gas) at roughly the same pressure as the air (or other gas) that will be supplied to the connector 18 is injected through the tube 160 into the void space 174, establishing a pressure within the void space 174. Then the supply valve 164 is closed, and the three-way valve 166 is positioned to allow communication between the void space or gap 174 and the pressure gauge 170.

Figure 20:
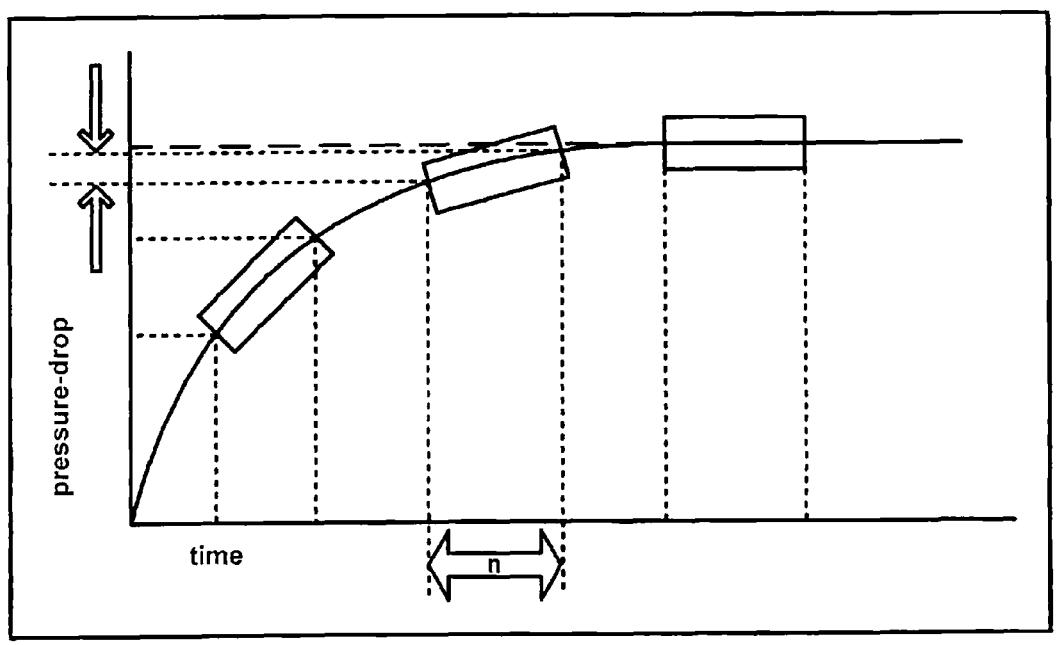
FIG. 20 is a graph showing pressure measurements over a period of time.

A computer monitors the pressure at the pressure gauge 170 over a period of time and determines whether it meets the desired stability in terms of a certain number of pressure measurements within a desired range over a certain period of time, indicating that a good seal has been made, as shown in FIG. 20. Then the test or blowdown can be conducted. The pressure gauge 170 continues to be monitored as the test is being conducted to continue to ensure a good seal for the test. Once the test is completed, the three-way valve 166 is shifted to vent to atmosphere, the nut 20 is loosened, and the device is removed from the reactor tube 10.

While this arrangement uses gas at a pressure above ambient to see whether the pressure in the void space drops due to a leak, it would also be possible to use gas at a pressure below ambient and see whether the pressure in the void space rises due to a leak. Also, while this arrangement was developed for use with chemical reactor tubes, it may be used to check for leaks in other vessels or containments as well. If no other test or operation is to be conducted other than the leak test, then there may be only two probes extending through the outer seal, one for injecting the gas and one for measuring the pressure in the void space, and there may be no probe extending through the inner seal.

FIGS. 13-19 show a variety of conditions that can be encountered at the top of the reactor tube 10, all of which can be accommodated by the seal device 50. In FIG. 13, the top of the reactor tube 10 is flush with the top of the tubesheet 12. In FIG. 14, the top of the reactor tube 10 projects above the top of the tubesheet 12. In FIG. 15, the top of the reactor tube 10 is recessed inside the top of the tubesheet 12. FIGS. 16 through 18 depict the same conditions as FIGS. 13 through 15 respectively, but with a weld bead 8 securing the reactor tube 10 to the tubesheet 12.

Figure 19:
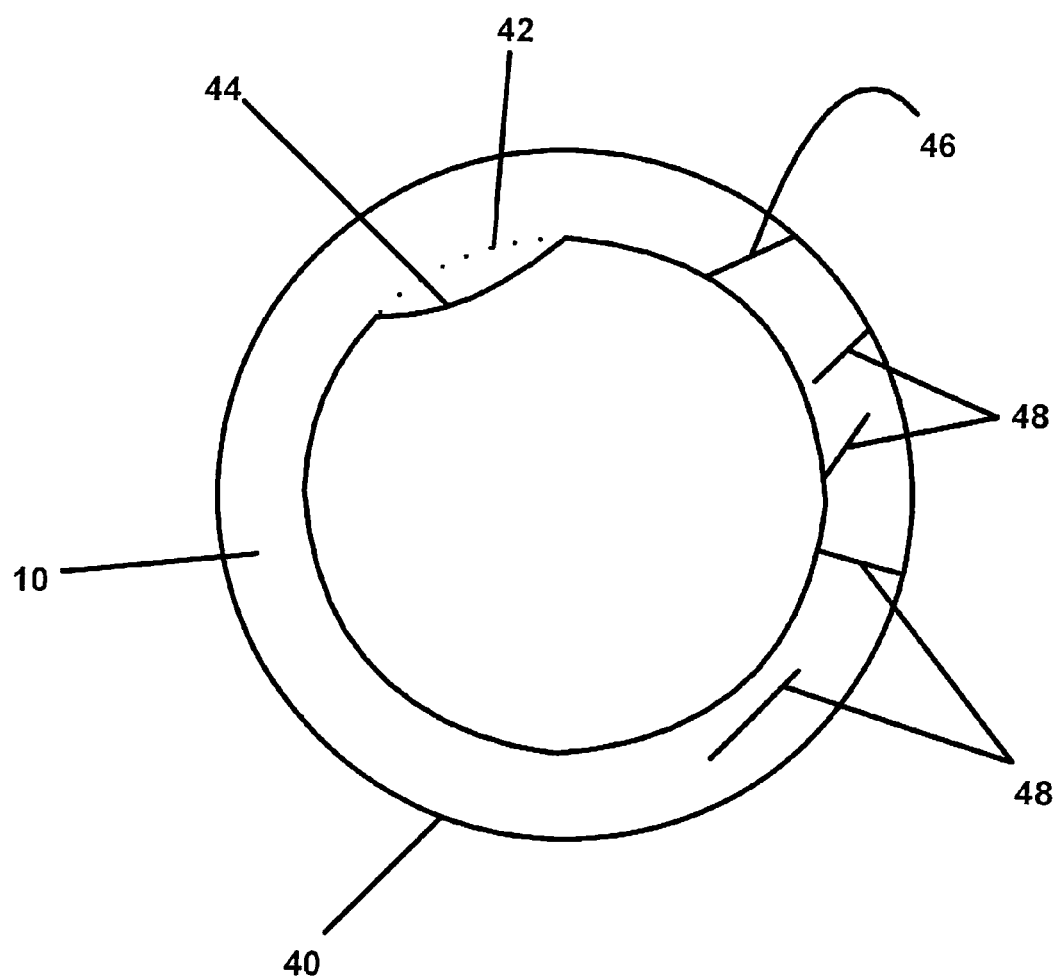
FIG. 19 is a top view of a chemical reactor tube showing another condition that may be encountered in the top portion of the tube to be sealed.

FIG. 19 is a top view of a reactor tube 10 depicting several quality issues which may arise and which affect the ability to make a good seal with prior art devices, such as with the rubber stopper shown in FIG. 4. The reactor tube 10 has an outer diameter 40 and an inner diameter 42. A weld repair 44 is shown which overhangs and reduces the inner diameter 42 of a portion of the tube 10, giving the inner surface of the tube an irregular, non-circular cross-section. Scratches and gouges 46 on top of the tube 10 may allow leaks to occur if a rubber stopper 2 is used (See FIG. 4). Weld repair overlays 48 can result in high spots from the weld which can also allow leaks to occur with a prior art stopper, even when extreme force is used to push against the stopper. All of these conditions are reliably sealed with the seals described herein.

Figure 21:
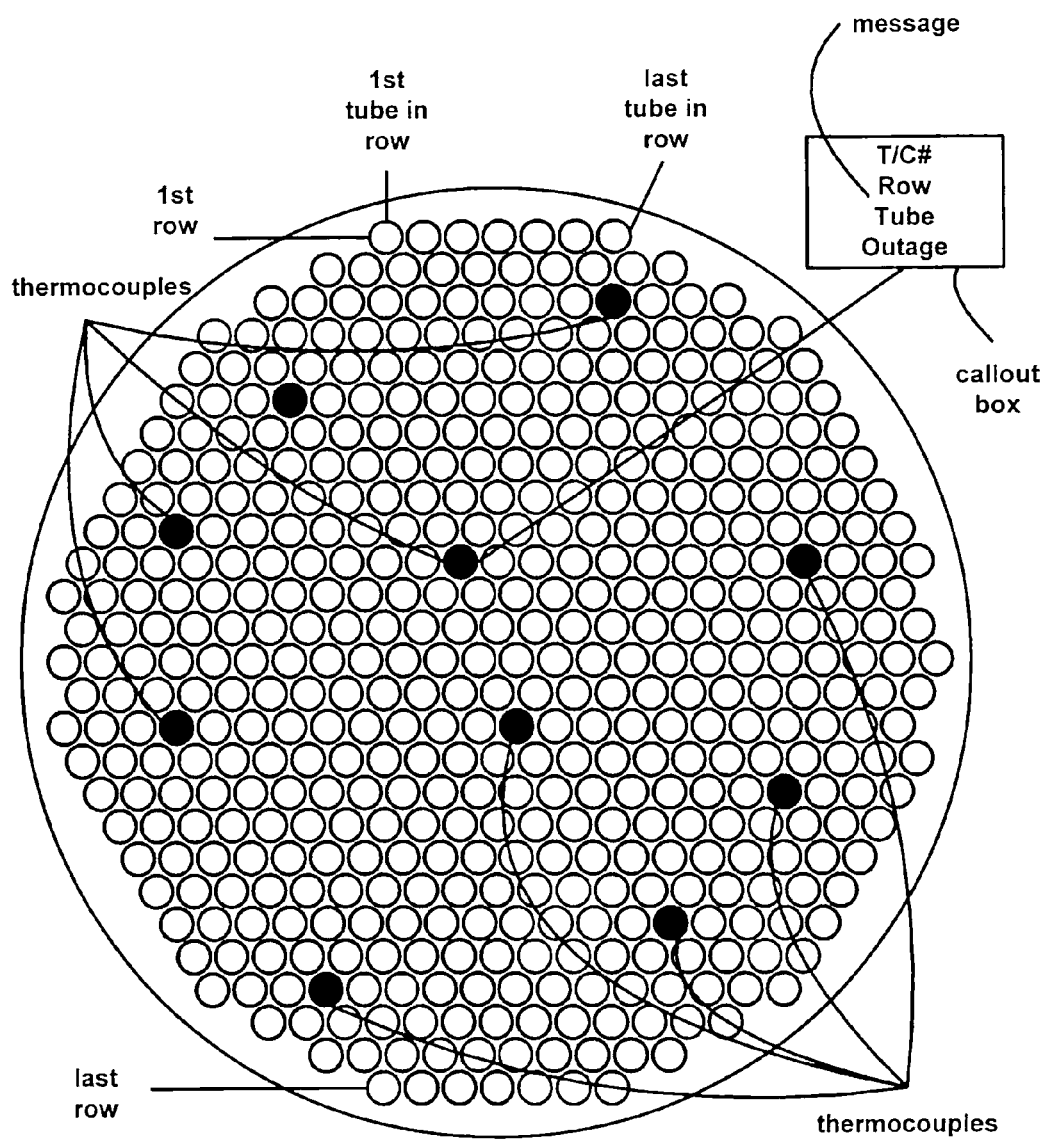
FIG. 21 is a graphic representation of the reactor which is used to present test results and to indicate the location of special tubes, such as those with thermowells.
Figure 23:
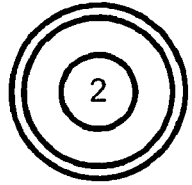
FIG. 23 is a representation of the format that may be used to present the test results.

FIGS. 21 and 23 are graphic displays that are generated by the tube testing or blowdown system, as generally explained in the referenced patents. However, the display of FIG. 23 is specifically for the reactor tubes 10 that include thermowell projections 14.

FIG. 21 is a graphic representation of the tubesheet 12 of the reactor being tested, having the same shape and tube arrangement as the tubesheet 12. It indicates the numbering convention used, including first and last rows as well as first and last tubes in each row. The reactor tubes containing thermowells or thermocouples are typically identified by a different color from the regular tubes (black instead of white in this instance). As the computer cursor is placed over the graphic representation of a particular tube, the relevant information is displayed in the callout box as shown in FIG. 23. The message displayed in the callout box may include information such as the number of the thermocouple or other probe, the row number, the tube number (within that row), and the outage level and/or the pressure drop data, as well as an indication of the reliability of the seal based on the data from the pressure sensor 170.

Figure 22:
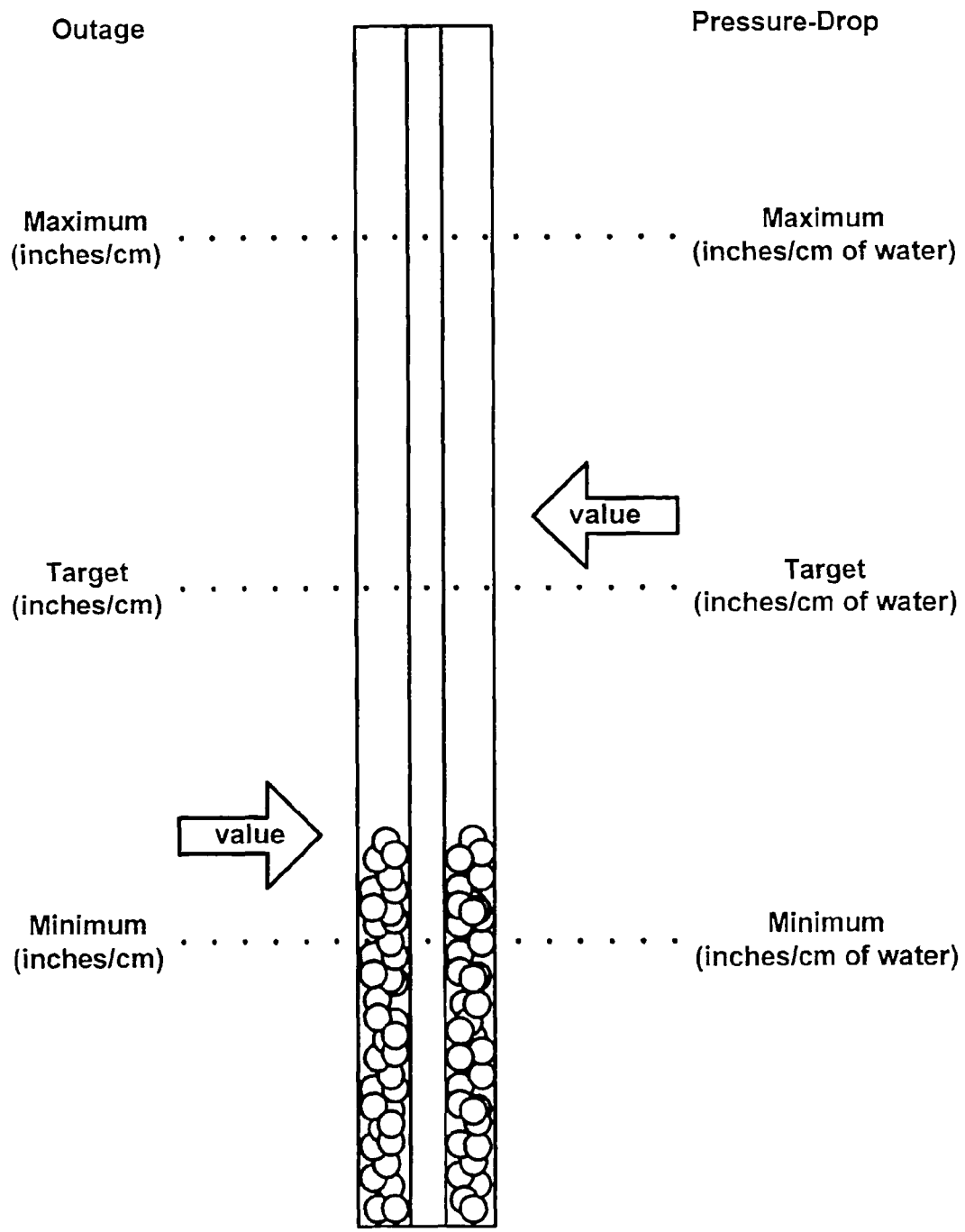
FIG. 22 is a graphic display that may be used to help load, analyze and test thermocouples.

FIG. 22 is another type of graphic display generated by the system, which shows the pressure drop value as measured with the aid of the device 50, correlated to certain levels of loading and indicating the target value and maximum and minimum values.

Figure 5A:
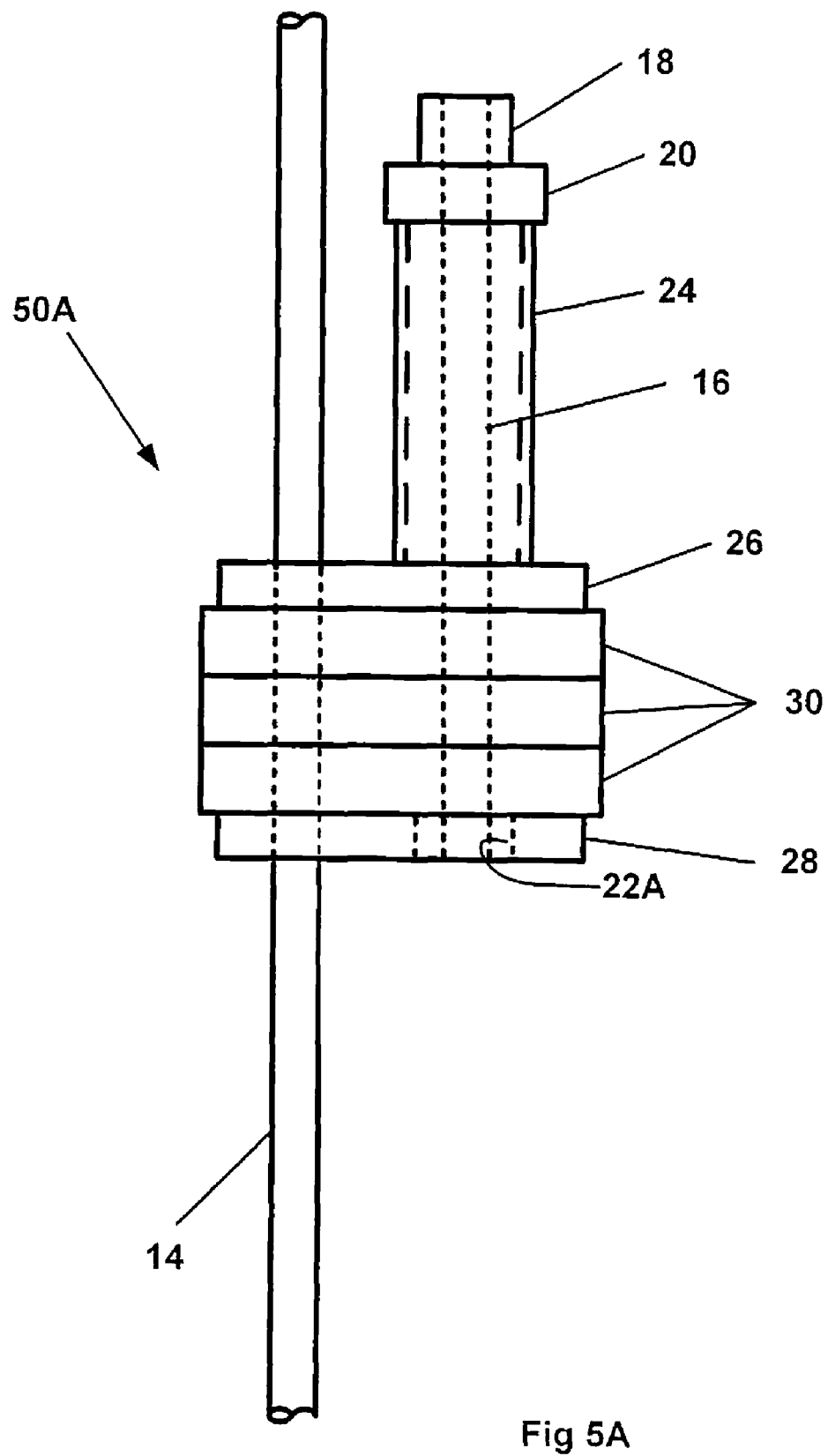
FIG. 5A is a front view, similar to that of FIG. 5, but for another embodiment of a sealing device made in accordance with the present invention.

FIG. 5A depicts another embodiment of a sealing device 50A made in accordance with the present invention. This is very similar to the sealing device 50 of FIG. 5, except that the injector tube 16 is threaded directly into the bottom rigid plate 28 instead of having a separate lower nut 22. Of course, instead of, or in addition to threading into this bottom rigid plate 28, the injector tube 16 could be welded or otherwise secured to the bottom rigid plate 28. The operation of the sealing device 50A is otherwise identical to that of the sealing device 50 described above.

While the terms "upper" and "lower" and "horizontal" are used herein, it should be understood that this terminology is intended only to describe the relative positions of parts, and the device could be used in other orientations, such as in the bottom tubesheet of the reactor, or in the end of a horizontal tube, for instance. Also, while the rigid plates and flexible plates shown here are circular, they would be shaped to conform to the shape of the tube (including a duct or conduit) against which the seal is intended to seal, which could be oval, square, or many other shapes. It will be obvious to those skilled in the art that modifications may be made to the embodiments described above without departing from the scope of the present invention.

What is claimed is:

1. A seal for a tube having a projection coming out of the tube, comprising:
   upper and lower rigid plates, each having a perimeter and defining first and second openings, wherein said first openings extend to the perimeter of their respective plates;
   at least one flexible plate having a perimeter and defining first and second openings, wherein said first opening extends to the perimeter of the flexible plate, said flexible plate being sandwiched between the upper and lower rigid plates;
   wherein said first openings of said upper and lower rigid plates and of said flexible plate are vertically aligned and said second openings of said upper and lower rigid plates and of said flexible plate are vertically aligned; and
   wherein said upper and lower rigid plates have substantially the same diameter and said flexible plate has a diameter that expands to be larger than the diameter of the upper and lower rigid plates when it is compressed between the upper and lower rigid plates.

2. A seal for a tube having a projection coming out of the tube as recited in claim 1, and further comprising compression means extending through said second openings for moving the upper and lower rigid plates toward each other to compress the flexible plate, said compression means including an injector tube extending through said second openings.

3. A seal for a tube having a projection coming out of the tube as recited in claim 2, wherein there is a plurality of said flexible plates between said upper and lower rigid plates and wherein said compression means includes at least one nut threaded onto the injector tube.

4. A seal for a tube as recited in claim 2, wherein said upper and lower rigid plates and said flexible plate are located inside a chemical reactor tube, with a projection from the tube extending through said first aligned openings and with said flexible plate sealing against the inner surface of said chemical reactor tube and sealing around the projection.

5. A seal for a tube as recited in claim 2, wherein each of said upper and lower rigid plates and said flexible plate also defines a third opening, and said respective third openings are vertically aligned.

6. A seal for a tube as recited in claim 5, and further comprising a tube received in said aligned third openings.

7. A seal for a tube having a projection coming out of the tube as recited in claim 2, wherein said compression means further includes a compression sleeve surrounding said injector tube above said upper rigid plate.

8. A seal for a tube having a projection coming out of the tube as recited in claim 7, wherein said compression means further includes at least one nut threaded onto the injector tube above said compression sleeve.

* * * * *